(12) United States Patent
Zhang et al.

(10) Patent No.: US 12,483,641 B2
(45) Date of Patent: Nov. 25, 2025

(54) FOLDABLE ELECTRONIC DEVICE

(71) Applicant: Honor Device Co., Ltd., Shenzhen (CN)

(72) Inventors: Handong Zhang, Shenzhen (CN); Yuan Wang, Shenzhen (CN); Yameng Wei, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/023,505

(22) PCT Filed: Sep. 5, 2022

(86) PCT No.: PCT/CN2022/117010
§ 371 (c)(1),
(2) Date: Feb. 27, 2023

(87) PCT Pub. No.: WO2023/098197
PCT Pub. Date: Jun. 8, 2023

(65) Prior Publication Data
US 2024/0275871 A1   Aug. 15, 2024

(30) Foreign Application Priority Data

Nov. 30, 2021 (CN) .......................... 202111449371.4

(51) Int. Cl.
*H04M 1/02* (2006.01)
*G06F 1/16* (2006.01)

(52) U.S. Cl.
CPC ........ *H04M 1/0216* (2013.01); *G06F 1/1641* (2013.01); *G06F 1/1652* (2013.01); *H04M 1/0268* (2013.01)

(58) Field of Classification Search
CPC .. H04M 1/0216; H04M 1/0268; H04M 1/022; G06F 1/1641; G06F 1/1652; G06F 1/1616; G06F 1/1681; G09F 9/301
See application file for complete search history.

(56) References Cited

U.S. PATENT DOCUMENTS 10,416,726 B2   9/2019  Lin
10,827,633 B2   11/2020 Yoo et al.
(Continued)

FOREIGN PATENT DOCUMENTS

CN   207053559 U   2/2018
CN   110582804 A   12/2019
(Continued)

*Primary Examiner* — Santiago Garcia
(74) *Attorney, Agent, or Firm* — Leydig, Voit & Mayer, Ltd.

(57) ABSTRACT

Embodiments of this application provide a foldable electronic device, including a shaft cover, a device body, and a first swing arm; a second swing arm coupled to a damping component inside the shaft cover and distributed in parallel to the first swing arm; and a pin connecting the first swing arm and the second swing arm so that the second swing arm follows the first swing arm to rotate and transmits a damping force produced by the damping component to the first swing arm through the pin. In the electronic device according to the embodiments of this application, fitting between the annular groove and the boss increases a sectional area of a joint between the first swing arm and the second swing arm and reduces shear stress experienced by the pin, avoiding fracture of the pin under undesirably large shear stress, thereby improving reliability of the device.

19 Claims, 10 Drawing Sheets

(56) References Cited

U.S. PATENT DOCUMENTS

| | | | | |
|---|---|---|---|---|
| 2006/0063416 A1* | 3/2006 | Takagi | ................ | H04M 1/0218 |
| | | | | 439/394 |
| 2015/0167052 A1* | 6/2015 | Griffin | .............. | B01L 3/502707 |
| | | | | 435/6.12 |
| 2016/0324023 A1 | 11/2016 | Kim et al. | | |
| 2021/0191469 A1* | 6/2021 | Li | ......................... | G06F 1/1632 |
| 2021/0303032 A1* | 9/2021 | Hong | ...................... | H04M 1/02 |
| 2021/0341970 A1* | 11/2021 | Lee | ....................... | G06F 1/1681 |
| 2022/0187877 A1* | 6/2022 | Delaporte | ............. | G06F 1/1616 |
| 2022/0217859 A1* | 7/2022 | Lee | ....................... | G06F 1/1652 |
| 2022/0303371 A1 | 9/2022 | Liao et al. | | |
| 2022/0408580 A1* | 12/2022 | Shin | ...................... | G06F 1/1652 |
| 2023/0084038 A1* | 3/2023 | Yee | ......................... | G06F 1/162 |
| | | | | 361/679.27 |
| 2023/0107816 A1* | 4/2023 | Yoo | ...................... | H05K 5/0226 |
| | | | | 361/679.01 |
| 2023/0409090 A1* | 12/2023 | Hong | ...................... | G06F 1/1616 |
| 2024/0015909 A1* | 1/2024 | Peng | ..................... | H05K 5/0226 |
| 2024/0069604 A1* | 2/2024 | Xu | ......................... | G06F 1/1681 |
| 2024/0205313 A1* | 6/2024 | Kim | ....................... | G06F 1/1681 |
| 2024/0247683 A1* | 7/2024 | Hong | ..................... | F16C 11/04 |

FOREIGN PATENT DOCUMENTS

| | | |
|---|---|---|
| CN | 110891108 A | 3/2020 |
| CN | 112991957 A | 6/2021 |
| CN | 113194183 A | 7/2021 |
| CN | 113534891 A | 10/2021 |
| CN | 113643612 A | 11/2021 |
| CN | 114244926 A | 3/2022 |
| WO | 2021058034 A1 | 4/2021 |
| WO | 2021115462 A1 | 6/2021 |
| WO | 2021129882 A1 | 7/2021 |

\* cited by examiner

Sketch a  Sketch b

FOLDABLE ELECTRONIC DEVICE

CROSS-REFERENCE TO RELATED APPLICATIONS

This application is a National Stage of International Application No. PCT/CN2022/117010, filed on Sep. 5, 2022, which claims priority to Chinese Patent Application No. 202111449371.4, filed on Nov. 30, 2021, both of which are hereby incorporated by reference in their entireties.

TECHNICAL FIELD

This application relates to the field of terminal technologies, and in particular, to a foldable electronic device.

BACKGROUND

In recent years, with continuous development of display technologies and particularly the appearance of flexible displays that can be arbitrarily bended, electronic devices have been able to develop into more product forms, among which mobile phones having a foldable display are currently an emerging form of products.

A mobile phone having a foldable display is unfolded and folded through a rotating shaft structure that is inside a device body. At present, the rotating shaft structure of a mobile phone having a foldable display includes a shaft cover and a main swing arm. The main swing arm has one end in rotatable connection with the shaft cover and the other end extending toward the device body. In this way, when a user applies a force on the device body, the device body is folded or unfolded relative to the shaft cover under action of the external force applied by the user. In addition, the rotating shaft structure further includes a damping component and a secondary swing arm to provide some damping force so as to improve hand feel when the user folds or unfolds the device body. The damping component is arranged inside the shaft cover and may be a cam spring damping component, a gear damping component, or the like, which is not limited in this embodiment of this application. The secondary swing arm is arranged in parallel to the main swing arm, and has one end connected to the rotating shaft structure and the other end extending toward the device body. At the end close to the device body, the main swing arm is connected to the secondary swing arm through a pin. In this way, the damping force produced by the damping component can be transmitted to the main swing arm through the secondary swing arm and the pin and in turn transmitted to a middle frame and the user's hand.

However, because the damping force is transmitted between the secondary swing arm and the main swing arm only through the pin, the pin experiences a strong shear stress when bearing the damping force and therefore is prone to fracture. Such fracture interrupts the transmission of the damping force between the secondary swing arm and the main swing arm, making the device body lose its damping characteristic.

SUMMARY

Embodiments of this application provide a foldable electronic device whose device body has more reliable damping when folded or unfolded. The foldable electronic device includes a shaft cover and a device body; a first swing arm connecting the shaft cover and the device body and configured to be rotatable around a first axis that is inside the shaft cover, so that the device body is folded or unfolded around the first axis; a second swing arm distributed in parallel to the first swing arm in a direction of the first axis and coupled to a damping component that is inside the shaft cover; and a pin connecting the first swing arm and the second swing arm at an end close to the device body, so that the second swing arm follows the first swing arm to rotate around a second axis that is inside the shaft cover when the first swing arm rotates and transmits a damping force produced by the damping component to the first swing arm through the pin, where the first axis is parallel to the second axis. The first swing arm further includes an annular groove protruding toward the second swing arm, and the second swing arm further includes a boss protruding toward the first swing arm. The boss is embedded into the annular groove in an axial direction of the pin, so that the boss and the annular groove bear part of the damping force when the second swing arm follows the first swing arm to rotate.

In the foldable electronic device according to the embodiments of this application, fitting between the annular groove and the boss increases a sectional area of a joint between the first swing arm and the second swing arm and reduces shear stress experienced by the pin, avoiding fracture of the pin under an undesirably large shear stress, thereby making the device body of the electronic device have more reliable damping when folded or unfolded.

In an implementation, the first swing arm is provided with a first connection lug at an end that is away from the shaft cover, and the second swing arm is provided with a second connection lug at an end that is away from the shaft cover, where the first connection lug is distributed in parallel to the second connection lug in a direction of the first axis; the first connection lug is provided with a slide groove, where the slide groove runs through the first connection lug in the direction of the first axis; the second connection lug is provided with a pin hole, where the pin hole runs through the second connection lug in the direction of the first axis and is located in a projection of the slide groove in the direction of the first axis; and the pin runs through the slide groove and the pin hole to make the first swing arm and the second swing arm form a pin-shaft connection. In this way, the first connection lug and the second connection lug can increase sizes of the first swing arm and the second swing arm at the joint, guaranteeing that the first swing arm and the second swing arm can have redundant structural strength at the joint even if the first connection lug and the second connection lug are provided with the slide groove and the pin hole for running of the pin, thus improving connection reliability.

In an implementation, the first connection lug includes a first end surface facing the second connection lug, where the annular groove is arranged on the first end surface, and the slide groove is located in a region enclosed by an inner ring of the annular groove; the second connection lug includes a second end surface facing the first connection lug, where the boss is arranged on the second end surface, and the pin hole is located in a region enclosed by an edge of the boss; and the annular groove overlaps with the boss in thickness in an axial direction of the pin. In this way, the annular groove is distributed at an outer periphery of the slide groove and size of the boss is also larger than diameter of the pin hole, making the annular groove and the boss form a larger overlap area in the axial direction of the pin, facilitating transmission of the damping force between the annular groove and the boss.

In an implementation, a gap between the slide groove and the pin is smaller than a gap between the inner ring of the annular groove and the boss, and the pin is configured to deform when transmitting a damping force, so as to reduce the gap between the inner ring of the annular groove and the boss, where, when the damping force transmitted by the pin is greater than a threshold, the pin deforms to make the inner ring of the annular groove contact the boss, so that the boss and the annular groove bear part of the damping force. In this way, when a small damping force is transmitted between the first swing arm and the second swing arm, the pin slightly deforms, and the slide groove contacts the pin first without the annular groove contacting the boss yet. The damping force produced by the damping component is transmitted to the first swing arm through the pin. With the damping force increasing, the pin further deforms to make the gap between the inner ring of the annular groove and the boss further decrease until the annular groove and the boss contact with each other. At this point, the annular groove and the boss begin to bear part of the damping force, which not only reduces the shear stress experienced by the pin but also avoids further deformation of the pin, thereby avoiding fracture of the pin.

In an implementation, the slide groove is a rectangular groove, and a long side of the slide groove is parallel to the first swing arm to make the pin follow the first swing arm to slide in a direction of the long side of the slide groove when the first swing arm rotates and the first axis and the second axis are not coaxial. In this way, the pin, the first axis, and the second axis can be distributed in a dynamically triangular manner in the process of rotation of the first swing arm and the second swing arm to avoid structural deadlock.

In an implementation, the boss includes an upper edge facing the second swing arm and a lower edge facing away from the second swing arm; where the upper edge is parallel to the second swing arm; and the lower edge has an included angle with the upper edge, so that distance between the lower edge and the upper edge is reduced gradually in a direction approaching the shaft cover; where the included angle between the lower edge and the upper edge is greater than or equal to a target angle, where the target angle is a maximum value of an included angle between the first swing arm and the second swing angle when the second swing arm follows the first swing arm to rotate. In this way, when the first swing arm has rotation relative to the second swing arm, the inner ring of the annular groove does not collide with the outer edge of the boss.

In an implementation, length of the boss in a direction parallel to the second swing arm is greater than length of the boss in a direction perpendicular to the second swing arm. Such design helps increase a contact area between the upper edge of the boss and the annular groove, facilitating transmission of the damping force between the first swing arm and the second swing arm so as to reduce the shear stress.

In an implementation, in the direction parallel to the second swing arm, distance between the pin hole and an edge of the boss facing the shaft cover is greater than distance between the pin hole and an edge of the boss facing away from the shaft cover.

In an implementation, in the direction parallel to the first swing arm, distance between the slide groove and a short side of the first connection lug facing the shaft cover is greater than distance between the slide groove and a short side of the first connection lug facing away from the shaft cover. In this way, the pin hole is farther away from the second axis, conducive to increasing length of an arm of force of the second swing arm in transmitting a damping force, thereby reducing internal stress of the second swing arm.

In an implementation, the first connection lug is a rectangular connection lug, where a long side of the first connection lug is parallel to the first swing arm, and a short side of the first connection lug is perpendicular to the first swing arm. In this way, the first connection lug matches the slide groove in shape, and their long sides are in parallel, helping achieve a greater grooving length of the slide groove.

In an implementation, in the direction parallel to the first swing arm, distance between the slide groove and a short side of the first connection lug facing the shaft cover is greater than distance between the slide groove and a short side of the first connection lug facing away from the shaft cover. In this way, the slide groove can be farther away from the first axis, increasing length of an arm of force of the first swing arm, thereby reducing the force experienced by the first swing arm.

In an implementation, the pin includes a pin head and a pin rod, where diameter of the pin head is greater than diameter of the pin rod; the pin head is located at an end of the first connection lug facing away from the second connection lug and is in position interference with the first connection lug in a direction of an axis of the pin; and the pin rod has an end connected to the pin head and the other end extending through the slide groove and the pin hole to the outside of the second connection lug, where a cylindrical surface of the pin rod located outside the second connection lug is provided with a clamp slot, where a clamp spring is arranged inside the clamp slot, and the clamp spring forms position interference with the second connection lug in the direction of the axis of the pin. In this way, fitting between the pin and the clamp spring can restrict the pin from having axial displacement, preventing the pin from falling out of the slide groove and the pin hole.

In an implementation, the device body includes a middle frame, where the first swing arm is connected to the middle frame. In this way, a force applied by a user for folding or unfolding the device body can be transmitted to the first swing arm through the middle frame.

DESCRIPTION OF REFERENCE SIGNS 10. device body, 11. display, 12. middle frame, 20. rotating shaft structure, 30. shaft cover, 31. shaft cover bottom surface, 40. main swing arm, 50. secondary swing arm, 60. pin, 100. first swing arm, 110. annular groove, 120. first connection lug, 121. slide groove, 122. first end surface, 200. second swing arm, 210. boss, 211. upper edge, 212. lower edge, 220. second connection lug, 221. pin hole, 222. second end surface, 300. pin, 310. pin head, 320. pin rod, 321. clamp slot, and 322. clamp spring.

DETAILED DESCRIPTION OF EMBODIMENTS

In recent years, with continuous development of display technologies and particularly the appearance of flexible displays that can be arbitrarily bent, electronic devices have been able to develop into more product forms, among which mobile phones having a foldable display are currently an emerging form of products.

Figure 1:
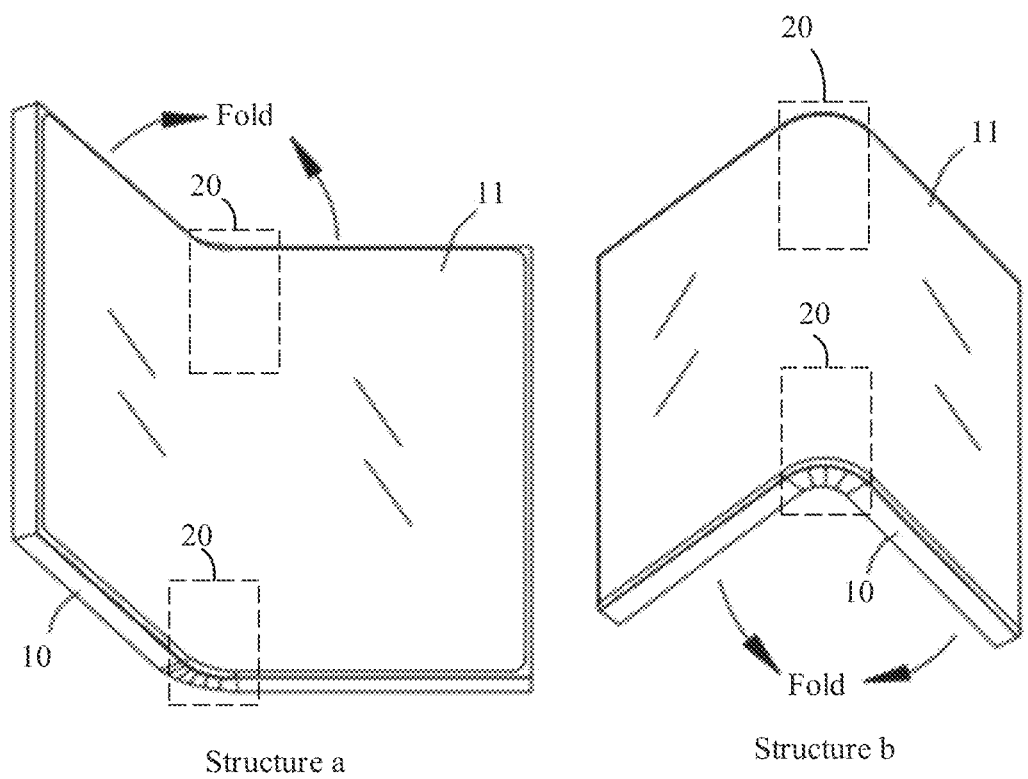
FIG. 1 is a schematic diagram of an existing mobile phone having a foldable display.

FIG. 1 is a schematic diagram of an existing mobile phone having a foldable display. As shown in FIG. 1, at present, according to different folding directions, mobile phones having a folded display may include mobile phones having an inward-folded display, mobile phones having an outward-folded display, and the like. A mobile phone having an inward-folded display is shown as structure a in FIG. 1, and a mobile phone having an outward-folded display is shown as structure b in FIG. 1. A device body 10 of a mobile phone having an inward-folded display can be folded toward a side of the display 11, and the display 11 is hidden at an inner side of the device body 10 after the device body 10 is folded, so that the display 11 is hidden when the device body 10 is folded and is presented when the device body 10 is unfolded. The device body 10 of a device having an outward-folded display can be folded toward the back side of the display 11, and the display 11 surrounds the outer side of the device body 10 after the device body 10 is folded, so that the display 11 surrounds the device body 10 to form a surrounding display when the device body 10 is folded and is presented as a normal straight display when the device body 10 is unfolded.

Figure 2:
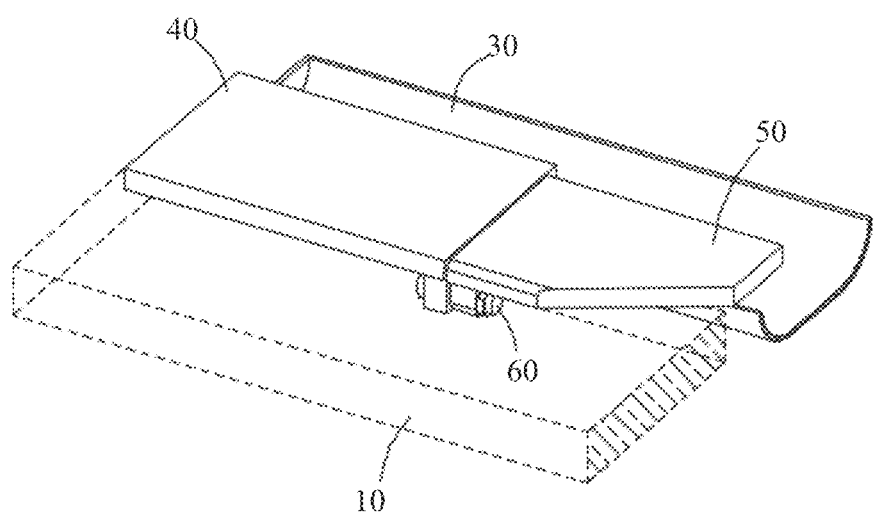
FIG. 2 is a local schematic diagram of a rotating shaft structure of an existing mobile phone having a foldable display.

A mobile phone having a foldable display can be unfolded and folded through a rotating shaft structure 20 that is inside the device body. FIG. 1 shows a position of the rotating shaft structure 20 in a mobile phone having a foldable display. FIG. 2 is a local schematic diagram of a rotating shaft structure 20 of an existing mobile phone having a foldable display. As shown in FIG. 2, the rotating shaft structure 20 of an existing mobile phone having a foldable display includes a shaft cover 30 and a main swing arm 40. The main swing arm 40 has one end in rotatable connection with the shaft cover 30 and the other end extending toward the device body 10. In this way, when a user applies a force on the device body 10, the device body 10 is folded or unfolded relative to the shaft cover 30 under action of the external force applied by the user. In addition, the rotating shaft structure 20 further includes a damping component (not shown in FIG. 2) and a secondary swing arm 50 to provide some damping force so as to improve hand feel when the user folds or unfolds the device body. The damping component is arranged inside the shaft cover 30 and may be a cam spring damping component, a gear damping component, or the like, which is not limited in embodiments of this application. The secondary swing arm 50 is arranged in parallel to the main swing arm 40, and has one end connected to the shaft cover 30 and the other end extending toward the device body 10. At an end close to the device body 10, the main swing arm 40 is connected to the secondary swing arm 50 through a pin 60. In this way, a damping force produced by the damping component can be transmitted to the main swing arm 40 through the secondary swing arm 50 and the pin 60 and in turn transmitted to the device body 10 and a user's hand.

However, for the structure shown in FIG. 2, the damping force is transmitted between the secondary swing arm 50 and the main swing arm 40 only through the pin 60, such that the pin 60 experiences more shear stress when being subjected to the damping force and is therefore prone to fracture. As a result, the transmission of the damping force between the secondary swing arm 50 and the main swing arm 40 is interrupted, making the device body 10 lose its damping characteristic.

Embodiments of this application provide a foldable electronic device. The electronic device may be, for example, a mobile phone having a foldable display, a tablet, a laptop, an e-book reader, a charging case for wireless earphones, a wearable device (for example, a pair of virtual reality (VR) glasses, a smart watch, a smart bracelet, and a head mounted display device), an electronic device with a hinge structure connecting two or more parts, or electronic devices in other product forms, which is not specifically limited herein. The foldable electronic device according to the embodiments of this application can avoid fracture of the pin shaft between the secondary swing arm and the main swing arm under an undesirably large shear stress, allowing the device body to have more reliable damping when folded or unfolded.

Figure 3:
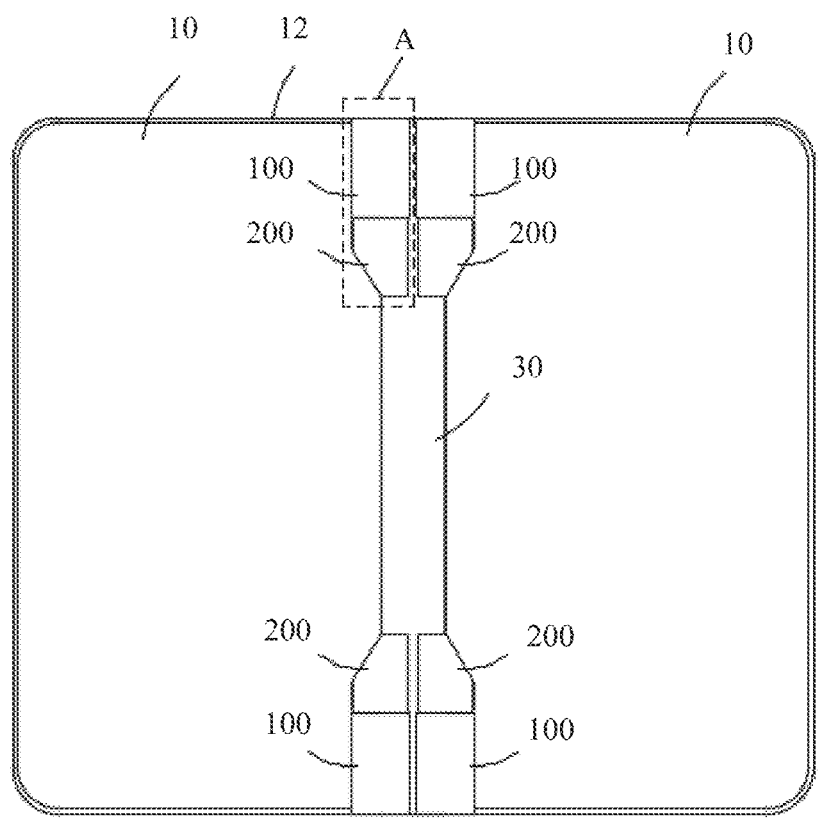
FIG. 3 is an overall schematic diagram of a foldable electronic device according to an embodiment of this application.

FIG. 3 is an overall schematic diagram of a foldable electronic device according to an embodiment of this application.

Figure 4:
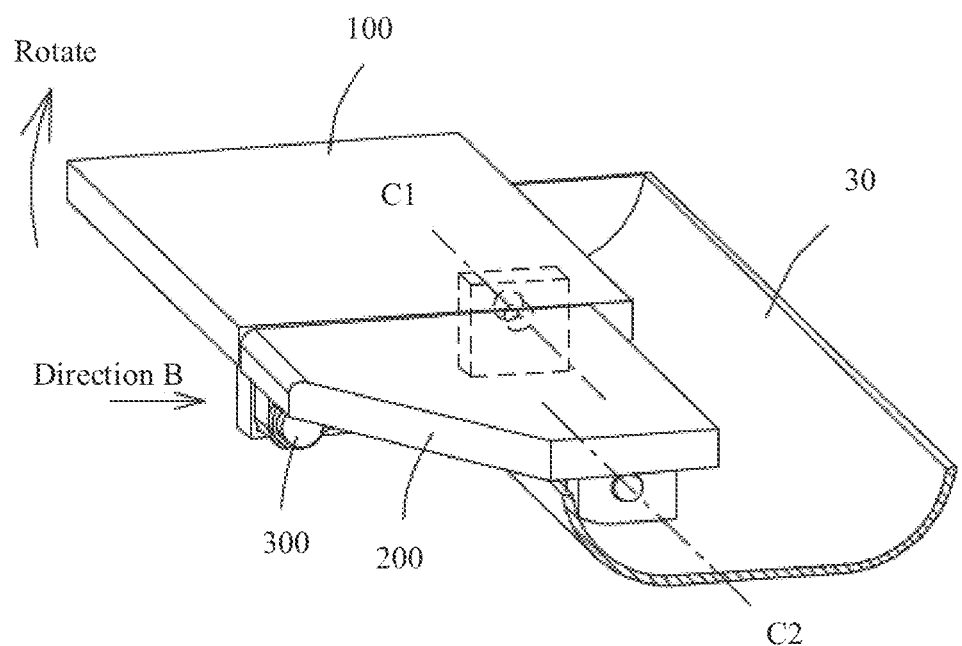
FIG. 4 is a local schematic diagram of a foldable electronic device according to an embodiment of this application.

FIG. 4 is a local schematic diagram of a foldable electronic device according to an embodiment of this application.

Refer to FIG. 3 and FIG. 4. The electronic device includes a shaft cover 30 and a device body 10 located on two sides of the shaft cover 30. The device body 10 of the electronic device is, on each side, connected to the shaft cover 30 through at least one first swing arm 100. The shaft cover 30 is a cavity structure, where a rotating shaft mechanism is arranged inside the cavity structure, the first swing arm 100 has one end in rotatable connection with the shaft cover 30 through the rotating shaft mechanism that is inside the shaft cover 30 and the other end extending toward one side of the device body 10 to be connected to the middle frame 12 of the device body 10. In this way, the first swing arm 100 is able to rotate around the first axis C1 that is inside the shaft cover 30, so that the device body 10 can be folded or unfolded around the first axis C1.

Furthermore, as shown in FIG. 3 and FIG. 4, each first swing arm 100 is correspondingly provided with a second swing arm 200, and the second swing arm 200 is distributed in parallel to the corresponding first swing arm 100 in a direction of the first axis C1. The second swing arm 200 has an end in rotatable connection with the shaft cover 30 through the rotating shaft mechanism that is inside the shaft cover 30 and the other end extending toward one side of the device body 10. In this way, the second swing arm 200 is able to rotate around a second axis C2 that is inside the shaft cover 30, where the first axis C1 is parallel to the second axis C2. In addition, a damping component is arranged inside the shaft cover 30, where the damping component may be a cam spring damping component, a gear damping component, or the like. The damping component is coupled to the second swing arm 200 to produce a damping force opposite to the rotating direction of the second swing arm 200 when the second swing arm 200 rotates around the second axis C2, where the damping force is applied on the second swing arm 200.

Furthermore, as shown in FIG. 3 and FIG. 4, at an end close to the device body 10, the first swing arm 100 is connected to the corresponding second swing arm 200 through a pin 300. In this way, when a user applies some force on the device body 10, the first swing arm 100 connected to the device body 10 rotates around the first axis C1 under action of the force, and the second swing arm 200 follows the first swing arm 100 to rotate around the second axis C2 under action of the pin 300 connected. In this way, the damping force applied on the second swing arm 200 by the damping component is transmitted to the first swing arm 100 through the pin 300, then transmitted to the middle frame 12 and the device body 10 by the first swing arm 100, and finally transmitted to the user's hand, allowing the user to feel some damping and high class quality when the user folds or unfolds the device body 10.

Figure 5:
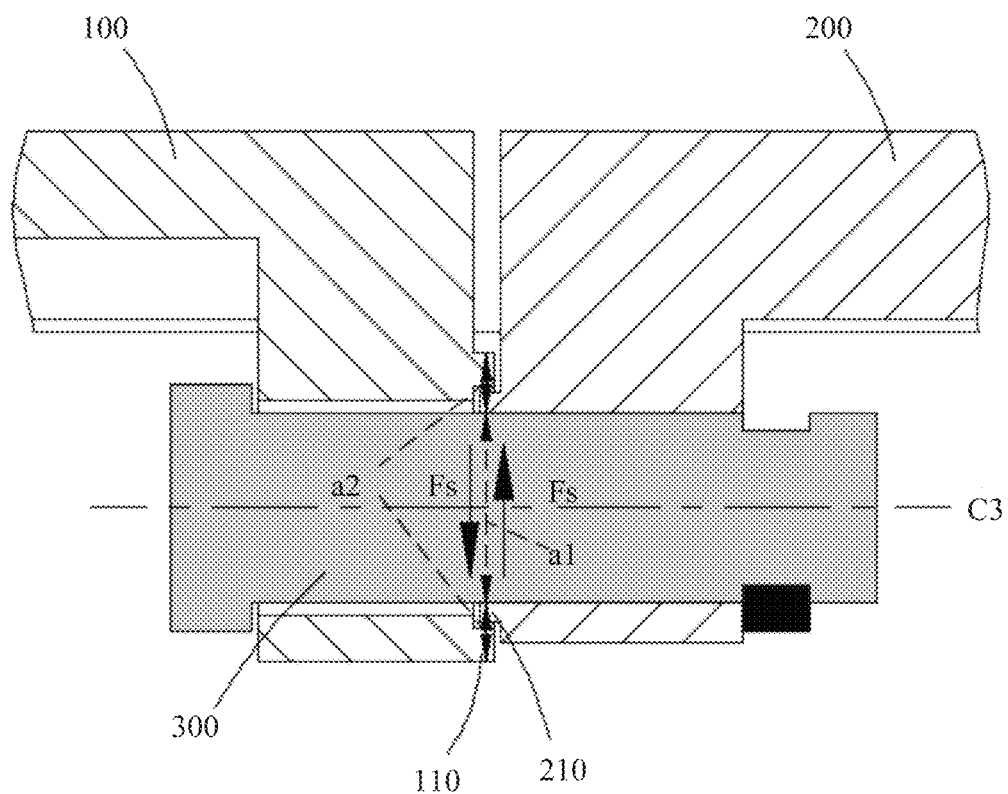
FIG. 5 is a sectional view of a first swing arm and a second swing arm being connected to a pin according to an embodiment of this application.

FIG. 5 is a sectional view of a first swing arm and a second swing arm being connected to a pin according to an embodiment of this application.

As shown in FIG. 5, a gap is provided between the first swing arm 100 and the second swing arm 200. The first swing arm 100 further includes an annular groove 110 protruding toward the second swing arm 200, and the second swing arm 200 further includes the boss 210 protruding toward the first swing arm 100 and corresponding to the annular groove 110, where the boss 210 is embedded into the annular groove 110 in an axial direction of the pin 300, meaning that the annular groove 110 overlaps with the boss 210 in thickness in the axial direction of the pin 300. In this way, when the second swing arm 200 follows the first swing arm 100 to rotate, the annular groove 110 contacts the boss 210 in a rotating direction of the first swing arm 100 and the second swing arm 200 (that is, in a direction perpendicular to an axis C3 of the pin 300). In this way, the damping force applied by the damping component on the second swing arm 200 can be partly transmitted to the first swing arm 100 through the boss 210 and the annular groove 110, and partly transmitted to the first swing arm 100 through the pin 300, reducing the shear stress experienced by the pin 300 at the joint between the first swing arm 100 and the second swing arm 200 when the pin 300 transmits the damping force, thereby avoid fracture of the pin 300 caused by an undesirably large shear stress.

The following briefly analyzes stress situations of the pin 300 at the joint between the first swing arm 100 and the second swing arm 200 with reference to FIG. 5 to illustrate the mechanical principle of this application for reducing the shear stress experienced by the pin 300. As shown in FIG. 5, when a user applies a force on the device body of the electronic device so as to fold or unfold the device body, a folding force applied by the user is transmitted to the first swing arm 100 through a frame of the device body. At the same time, due to rotation, the second swing arm 200 experiences a damping force from the damping component, where the damping force has the same strength as but a different direction than the folding force. Therefore, the folding force applied by the user and the damping force produced by the damping component can together produce a shear force Fs at the joint between the first swing arm 100 and the second swing arm 200, where the shear force Fs acts on the joint between the first swing arm 100 and the second swing arm 200 to make the joint experience a shear stress t. According to a formula for calculating the shear stress t, magnitude of the shear stress t is proportional to magnitude of the shear force Fs and is inversely proportional to the size of the sectional area a of a shearing surface. For the joint between the first swing arm 100 and the second swing arm 200, the shear stress t experienced by the joint satisfies the following formula:

$$t = \frac{Fs}{a} \quad (1)$$

In the formula, t is the shear stress experienced by the joint between the first swing arm 100 and the second swing arm 200, Fs is the shear force experienced by the joint between the first swing arm 100 and the second swing arm 200, and a is a total sectional area of the joint between the first swing arm 100 and the second swing arm 200. In the embodiments of this application, the joint between the first swing arm 100 and the second swing arm 200 includes the pin 300 and the annular groove 110 and the boss 210 that contact each other. For ease of description, herein, a1 is used to represent the sectional area of the pin 300, and a2 is used to represent the sectional area of the joint between the annular groove 110 and the boss 210. Then, the total sectional area a of the joint between the first swing arm 100 and the second swing arm 200 is a=a1+a2.

Therefore, in the embodiments of this application, the shear stress t1 experienced by the pin 300 is actually:

$$t1 = \frac{Fs}{a1 + a2} \quad (2)$$

By contrast, for the conventional technical solution including no annular groove 110 or boss 210, the shear stress t2 experienced by the pin 300 is:

$$t2 = \frac{Fs}{a1} \quad (3)$$

As can be seen by comparing formula (2) and formula (3), with respect to the conventional technical solution, the embodiments of this application include an additional annular groove 110 and boss 210 at the joint between the first swing arm 100 and the second swing arm 200 to provide an additional sectional area a2 at the joint between the first swing arm 100 and the second swing arm 200, so that the sectional area of the joint between the first swing arm 100 and the second swing arm 200 increases to a1+a2 from a1. Due to increase in the sectional area, the shear stress experienced by the pin 300 decreases to t1 in the embodiments of this application from t2 in the conventional solution. It can be learned that, in the technical solution according to the embodiments of this application, increasing the sectional area of the joint between the first swing arm 100 and the second swing arm 200 reduces the shear stress experienced by the pin 300, avoiding fracture of the pin 300 under an undesirably large shear stress, thereby making the device body of the electronic device have more reliable damping when folded or unfolded.

Figure 6A:
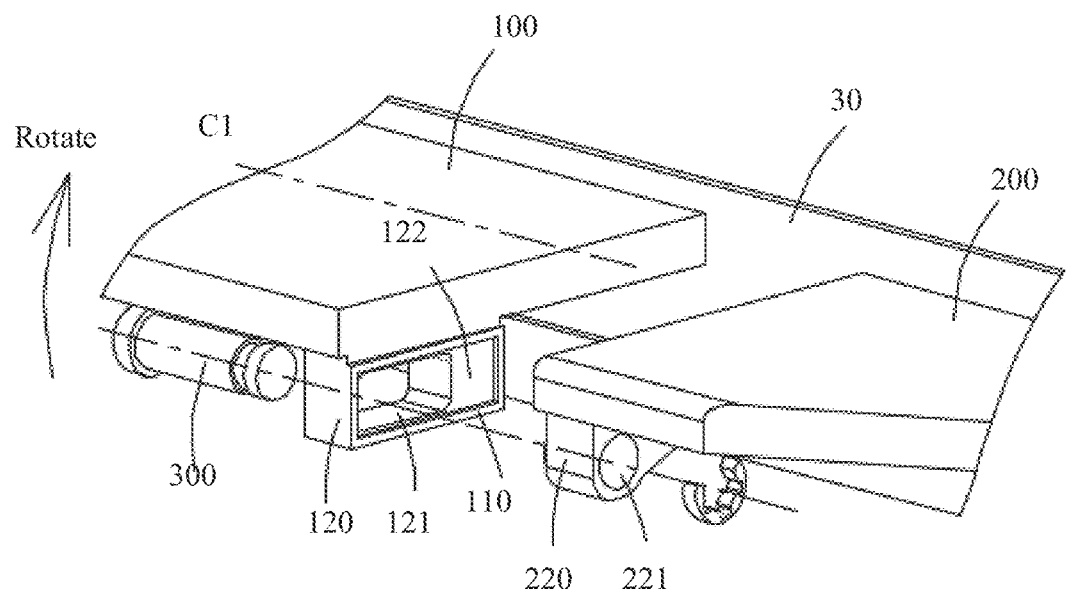
FIG. 6A and FIG. 6B are exploded views of a first swing arm, a second swing arm, and a pin from different perspectives, according to an embodiment of this application.
Figure 6B:
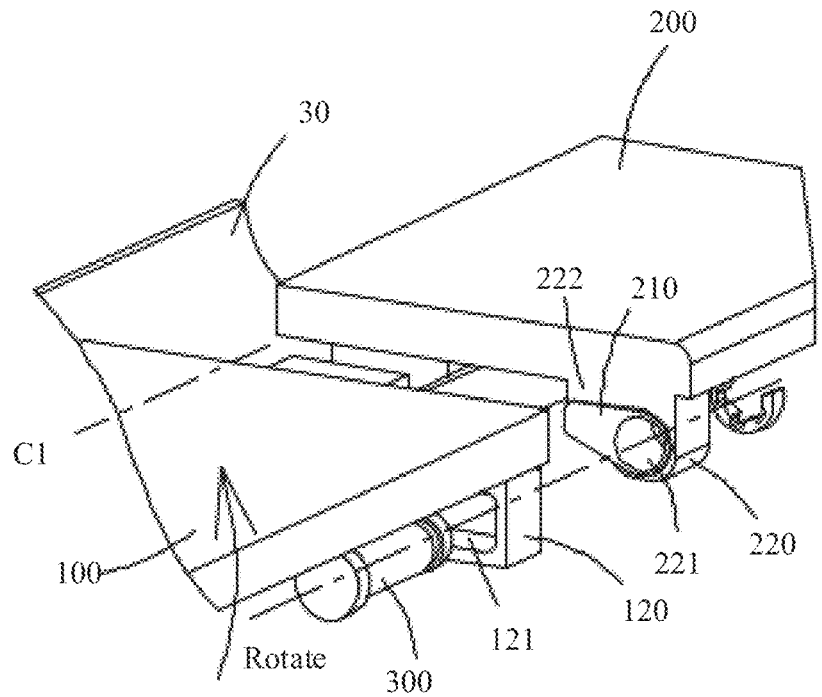

FIG. 6A and FIG. 6B are exploded views of a first swing arm, a second swing arm, and a pin from different perspectives, according to an embodiment of this application.

As shown in FIG. 6A and FIG. 6B, in an implementation, the first swing arm 100 is provided with a first connection lug 120 at an end that is away from the shaft cover 30, and the second swing arm 200 is provided with a second connection lug 220 at an end that is away from the shaft cover 30, where the first connection lug 120 is distributed in parallel to the second connection lug 220 in the direction of the first axis C1. In addition, the first connection lug 120 and the second connection lug 220 are arranged on the same side as the first swing arm 100 and the second swing arm 200 in a tangential direction of rotation of the first swing arm 100 and the second swing arm 200.

Furthermore, as shown in FIG. 6A and FIG. 6B, in an implementation, the first connection lug 120 is provided with a slide groove 121, where the slide groove 121 runs through the first connection lug 120 in the direction of the first axis C1. The second connection lug 220 is provided with a pin hole 221 corresponding to the slide groove 121 and running through the second connection lug 220 in the direction of the first axis C1, where diameter of the pin hole 221 is equal to diameter of the pin 300 and less than size of the slide groove 121, and the pin hole 221 is located in a projection of the slide groove 121 in the direction of the first axis C1. In this way, the pin 300 can pass through the slide groove 121 and the pin hole 221 to make the first swing arm 100 and the second swing arm 200 form a pin-shaft connection.

Furthermore, as shown in FIG. 6A and FIG. 6B, in an implementation, the first connection lug 120 includes a first end surface 122 facing the second connection lug 220, where the annular groove 110 is arranged on the first end surface 122, size of an inner ring of the annular groove 110 is greater than size of the slide groove 121, and the slide groove 121 is located in a region enclosed by the inner ring of the annular groove 110. In addition, the second connection lug 220 includes a second end surface 222 facing the first connection lug 120, where the second end surface 222 may be in parallel to and have some gap with the first end surface 122. The boss 210 is arranged on the second end surface 222, where size of the boss 210 is greater than diameter of the pin hole 221, and the pin hole 221 is located in a region enclosed by an edge of the boss 210.

It should be noted that, due to limited sizes of the device body, the first swing arm 100, and the second swing arm 200, the sectional area of the pin 300 is typically larger than the sectional area of the annular groove 110 and the boss 210. Therefore, in the embodiments of this application, although the pin 300, the annular groove 110, and the boss 210 all play a role in transmitting the damping force and bearing the shear stress, the pin 300 can serve as a main component for transmitting the damping force and bearing the shear stress, and the annular groove 110 and the boss 210 can serve as auxiliary components for transmitting the damping force and bearing the shear stress. In a specific implementation, when a user begins to fold or unfold the device body, the pin 300 is the first to transmit the damping force and bear the shear stress between the first swing arm 100 and the second swing arm 200. As the damping force increases, the annular groove 110 and the boss 210 begin to take part to share some functions of transmitting the damping force and bearing the shear stress.

Figure 7:
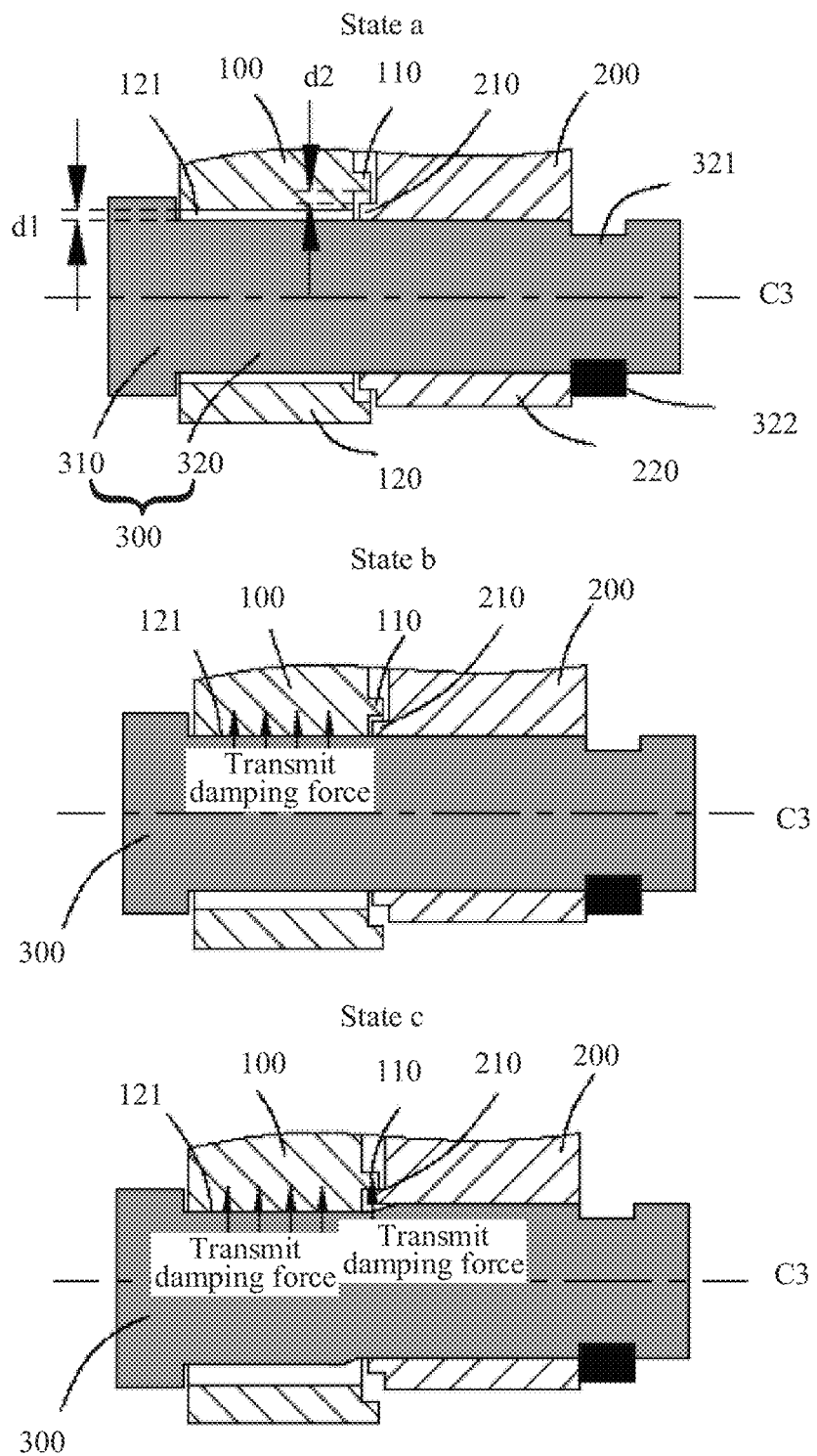
FIG. 7 is a schematic diagram of shear stress experienced by a pin, an annular groove, and a boss changing with a damping force, according to an embodiment of this application.

FIG. 7 is a schematic diagram of shear stress experienced by a pin, an annular groove, and a boss changing with a damping force, according to an embodiment of this application. As shown in FIG. 7, in order for the pin 300 to serve as the main component for transmitting the damping force and bearing the shear stress, and for the annular groove 110 and the boss 210 to serve as auxiliary components for transmitting the damping force and bearing the shear stress, in embodiments of this application, preferably, the size of the slide groove 121 is greater than the diameter of the pin 300 and the size of the inner ring of the annular groove 110 is greater than the size of the boss 210. In this way, as shown by state a of FIG. 7, when the pin 300 does not need to transmit any damping force, a gap d1 between the slide groove 121 and the pin 300 is smaller than a gap d2 between the inner ring of the annular groove 110 and the boss 210.

Furthermore, as shown by state b of FIG. 7, when a user folds or unfolds the device body of the electronic device, the first swing arm 100 first rotates so as to have tangential displacement relative to the pin 300 and the second swing arm 200 to make the slide groove 121 contact the pin 300, which in turn drives the second swing arm 200 to rotate. At this point, because the gap d1 between the slide groove 121 and the pin 300 is smaller than the gap d2 between the inner ring of the annular groove 110 and the boss 210, the annular groove 110 is not in contact with the boss 210 yet, and the damping force produced by the damping component is transmitted to the first swing arm 100 through the pin 300.

Furthermore, as shown by state c of FIG. 7, when the pin 300 is transmitting a damping force, the pin 300 experiences a shear force so as to deform, further increasing the tangential displacement of the first swing arm 100 relative to the second swing arm 200, so that the gap between the inner ring of the annular groove 110 and the boss 210 is reduced. The deformation degree of the pin 300 is related to the damping force it transmits: a greater damping force brings a greater shear force on the pin 300 and causes greater deformation. With the damping force transmitted by the pin 300 being greater than a threshold, the deformation thereof makes the gap between the inner ring of the annular groove 110 and the boss 210 further decrease until the annular groove 110 and the boss 210 contact each other. At this point, the annular groove 110 and the boss 210 begin to bear part of the damping force, which not only reduces the shear stress experienced by the pin 300, but also avoids further deformation of the pin 300, thereby avoiding fracture of the pin 300.

Furthermore, as shown in FIG. 7, in an implementation, the pin 300 includes a pin head 310 and a pin rod 320, where diameter of the pin head 310 is greater than diameter of the pin rod 320; the pin head 310 is located at an end of the first connection lug 120 facing away from the second connection lug 220 and is in position interference with the first connection lug 120 in a direction of an axis C3 of the pin 300 to restrict the pin 300 from having axial displacement in the direction of the second connection lug 220; and the pin rod 320 has an end connected to the pin head 310 and the other end extending through the slide groove 121 and the pin hole 221 to the outside of the second connection lug 220, where a cylindrical surface of the pin rod 320 located outside the second connection lug 220 is provided with a clamp slot 321, where a clamp spring 322 is arranged inside the clamp slot 321, and the clamp spring 322 forms position interference with the second connection lug 220 in the direction of the axis C3 of the pin 300 to restrict the pin 300 from having axial displacement in the direction of the first connection lug 120. Fitting between the pin 300 and the clamp spring 322 is for the ultimate purpose of limiting axial displacement of the pin 300, thereby preventing the pin 300 from falling out of the slide groove 121 and the pin hole 221.

Figure 8:
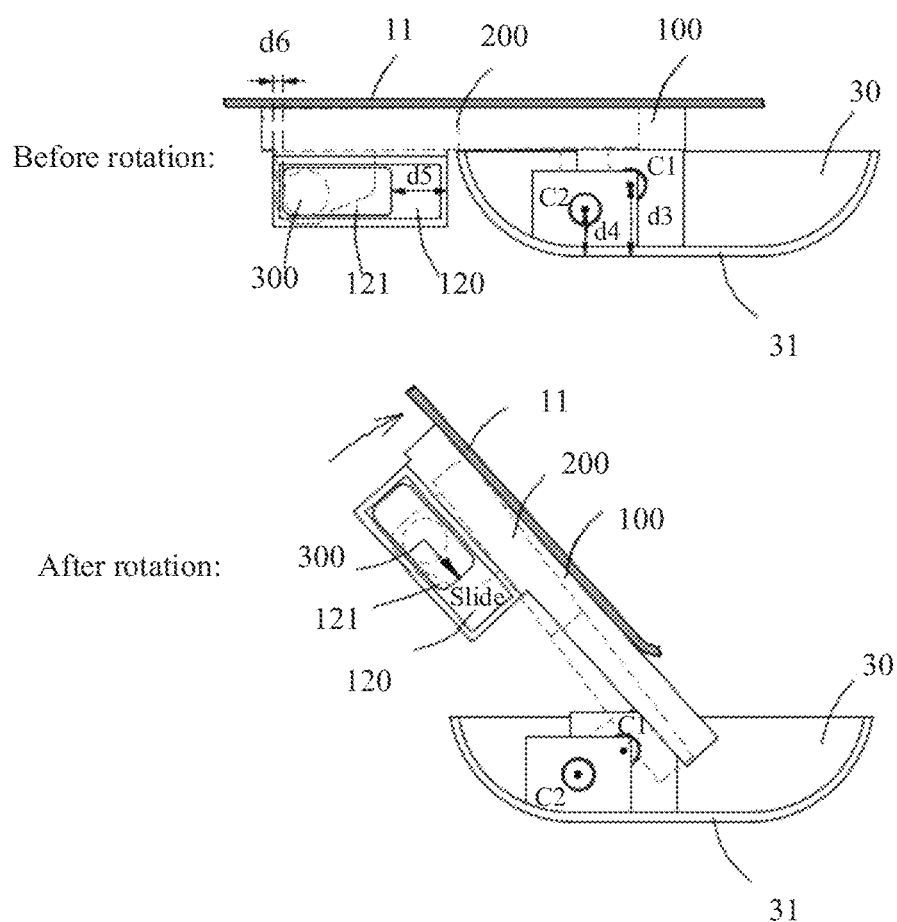
FIG. 8 is a schematic diagram of a joint between a first swing arm and a second swing arm in an axial direction of a pin, according to an embodiment of this application.

In the embodiments of this application, the first axis and the second axis can be coaxial, or at different axes, which is not limited in the embodiments of this application. FIG. 8 is a schematic diagram of a joint between the first swing arm 100 and the second swing arm 200 in an axial direction of the pin 300 when the first axis C1 and the second axis C2 are not coaxial, according to an embodiment of this application. For ease of displaying structures of the first connection lug 120 and the slide groove 121, FIG. 8 displays the second connection arm 200 and the pin 300 in dotted lines. As shown in FIG. 8, with the first axis C1 and the second axis C2 being not coaxial, the pin 300, the first axis C1, and the second axis C2 are distributed in a triangular manner, which provides stability. If the distances of the pin 300 relative to the first axis C1 and the second axis C2 are always unchanged, the first swing arm 100 and the second swing arm 200 will be unable to rotate due to the locking of the triangular structure. To make the first swing arm 100 and the second swing arm 200 rotatable when the first axis C1 and the second axis C2 are not coaxial, in the embodiments of this application, the first connection lug 120 may be a rectangular connection lug, where a long side of the first connection lug 120 is parallel to the first swing arm 100, and a short side of the first connection lug 120 is perpendicular to the first swing arm 100. Correspondingly, the slide groove 121 may also be a rectangular groove, where a long side of the slide groove 121 is parallel to the first swing arm 100, and a short side of the slide groove 121 is perpendicular to the first swing arm 100. In this way, when the first swing arm 100 and the second swing arm 200 rotate, the pin 300 also follows the first swing arm 100 to slide in a direction of the long side of the slide groove 121, so as to dynamically change the distance between the pin 300 and the first axis C1, making the pin 300, the first axis C1, and the second axis C2 distributed in a dynamically triangular manner during the rotation of the first swing arm 100 and the second swing arm 200, thus avoiding structural deadlock.

Furthermore, as shown in FIG. 8, in an implementation, distance d3 between the first axis C1 and a shaft cover bottom surface 31 is preferably greater than distance d4 between the second axis C2 and the shaft cover bottom surface 31, and the second axis C2 is closer to a side wall of the shaft cover 30 than the first axis C1. In this way, when the first swing arm 100 and the second swing arm 200 rotate, a wall surface of the second swing arm 200 is closer to the shaft cover 30 and farther away from the display 11 of the electronic device than a wall surface of the first swing arm 100, ensuring that the second swing arm 200 does not interfere with the first swing arm 100 supporting the display 11 during rotation.

Furthermore, as shown in FIG. 8, in an implementation, in the direction parallel to the first swing arm 100, distance d5 between the slide groove 121 and a short side of the first connection lug 120 facing the shaft cover 30 is greater than distance d6 between the slide groove 121 and a short side of the first connection lug 120 facing away from the shaft cover 30. In this way, the slide groove 121 can be farther away from the first axis C1 to increase length of an arm of force of the first swing arm 100, reducing the force acting on the first swing arm 100.

Figure 9:
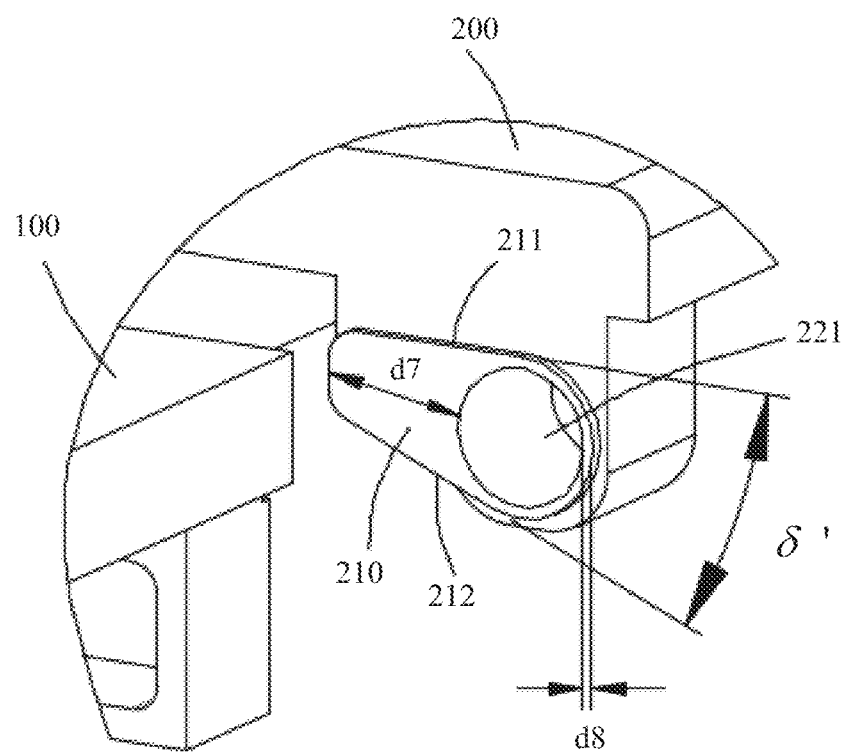
FIG. 9 is a schematic structural diagram of a boss according to an embodiment of this application.

FIG. 9 is a schematic structural diagram of a boss according to an embodiment of this application. As shown in FIG. 9, in an implementation, the boss 210 includes an upper edge 211 facing the second swing arm 200 and a lower edge 212 facing away from the second swing arm 200. The upper edge 211 of the boss 210 is parallel to the second swing arm 200. In this way, when the second swing arm 200 follows the first swing arm 100 to rotate, the upper edge 211 of the boss 210 can achieve surface contact with the long side of the annular groove, facilitating transmission of the damping force between the first swing arm 100 and the second swing arm 200 so as to reduce the shear stress; the lower edge 212 of the boss 210 has an included angle δ' with the upper edge 211 of the boss 210, where the included angle δ' makes distance between the lower edge 212 and the upper edge 211 reduced gradually in a direction approaching the shaft cover, making the lower edge 212 of the boss 210 form a slope surface relative to the upper edge 211 of the boss 210. The included angle δ' between the lower edge 212 of the boss 210 and the upper edge 211 of the boss 210 is greater than or equal to a target angle, where the target angle is a maximum value of the included angle δ between the first swing arm 100 and the second swing arm 200 when the second swing arm 200 follows the first swing arm 100 to rotate. In the embodiments of this application, a reason why the included angle δ is formed between the first swing arm 100 and the second swing arm 200 and a method for determining the included angle δ' are specifically described in the subsequent content.

Furthermore, as shown in FIG. 9, length of the boss 210 in a direction parallel to the second swing arm 200 is greater than length of the boss 210 in a direction perpendicular to the second swing arm 200. Such design helps increase a contact area between the upper edge 211 of the boss 210 and the annular groove, facilitating transmission of the damping force between the first swing arm 100 and the second swing arm 200 so as to reduce the shear stress.

Furthermore, as shown in FIG. 9, in the direction parallel to the second swing arm 200, distance d7 between the pin hole 221 and an edge of the boss 210 facing the shaft cover is greater than distance d8 between the pin hole 221 and an edge of the boss facing away from the shaft cover. In this way, the pin hole 221 is farther away from the second axis, conducive to increasing length of an arm of force of the second swing arm 200 in transmitting the damping force, thereby reducing the force experienced by the second swing arm 200.

Figure 10:
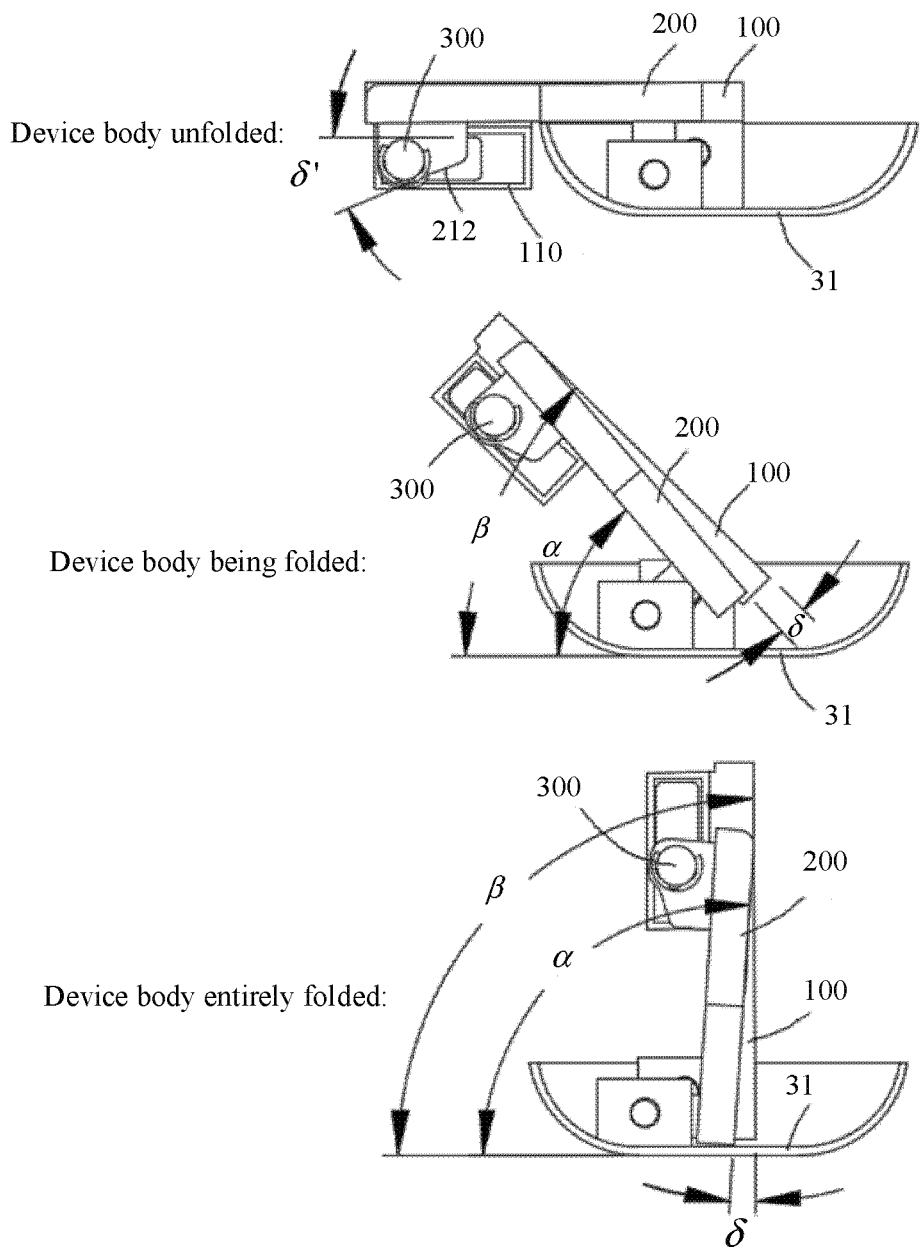
FIG. 10 is a schematic diagram of an included angle δ between a first swing arm and a second swing arm according to an embodiment of this application.

FIG. 10 is a schematic diagram of an included angle δ between a first swing arm and a second swing arm according to an embodiment of this application. With reference to FIG. 10, the reason why the included angle δ is formed between the first swing arm 100 and the second swing arm 200 and the method for determining the included angle δ' are specifically described below.

As shown in FIG. 10, for ease of describing rotation poses of the first swing arm 100 and the second swing arm 200, herein, the included angle between the first swing arm 100 and the shaft cover bottom surface 31 (corresponding to the horizontal plane in FIG. 10) is denoted as p, and the included angle between the second swing arm 200 and the shaft cover bottom surface 31 is denoted as u. When the first swing arm 100 and the second swing arm 200 are parallel to the shaft cover bottom surface 31 (corresponding to the device body of the electronic device being entirely unfolded), β=0° and α=0°. During folding of the device body, because the first axis and the second axis are not coaxial, the first swing arm 100 and the second swing arm 200 have different angular velocities. Therefore, the first swing arm 100 and the second swing arm 200 may have relative rotation to form a changeable included angle δ, where δ=α–β.

Correspondingly, when the first swing arm 100 and the second swing arm 200 have relative rotation, the annular groove 110 and the boss may also have relative rotation, where an angle produced by their relative rotation is also δ. In this case, with no included angle δ' provided between the lower edge 212 and the upper edge of the boss (for example, the upper edge of the boss is parallel to the lower edge 212 of the boss), the inner ring of the annular groove 110 will collide with the lower edge 212 of the boss to restrict the first swing arm 100 and the second swing arm 200 from continuing to rotate, causing structural deadlock. With an included angle δ' provided between the lower edge 212 and the upper edge of the boss, even though the annular groove 110 and the boss have relative rotation, collision of the inner ring of the annular groove 110 with the lower edge 212 of the boss can be avoided so long as the angle δ of the relative rotation is less than or equal to the included angle δ'. Therefore, to ensure that the inner ring of the annular groove 110 does not collide with the lower edge 212 at any state of folding or unfolding of the device body, the value of the included angle δ' should be greater than or equal to the maximum value of the included angle δ, preferably the value of the included angle δ' being equal to the maximum value of the included angle δ. In this way, when the device body is being unfolded from a folded state, the annular groove 110 can also contact the boss to transmit part of the damping force so as to reduce the shear stress experienced by the pin 300, thus increasing service life of the pin 300 and bearing ability of the joint between the first swing arm 100 and the second swing arm 200.

Figure 11:
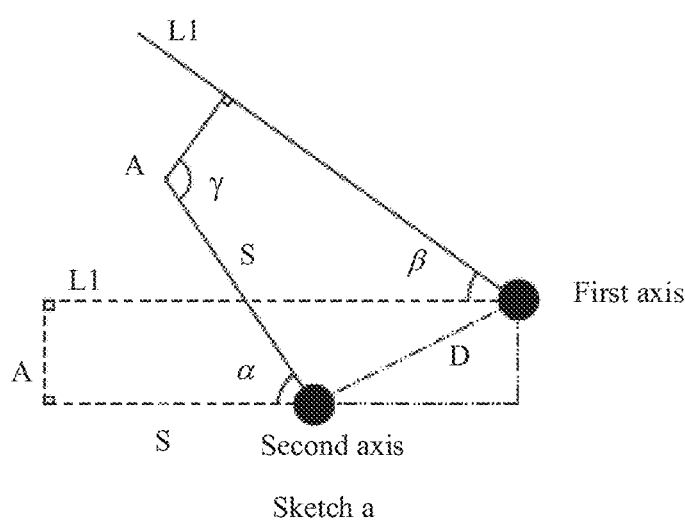
FIG. 11 is a sketch of a motion mechanism during rotation of a first swing arm and a second swing arm according to an embodiment of this application.
Figure 11:
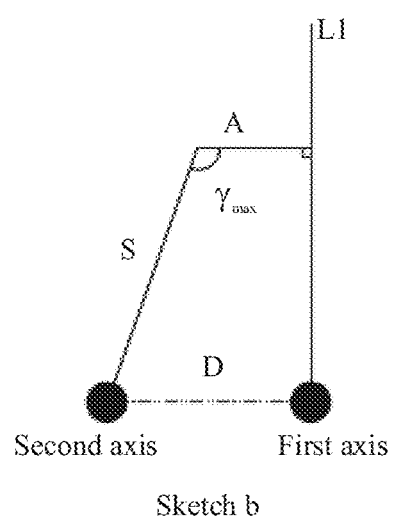

FIG. 11 is a sketch of a motion mechanism during rotation of a first swing arm and a second swing arm according to an embodiment of this application. With reference to FIG. 11, how the maximum value of the included angle δ is determined is described below. In FIG. 11, sketch a displays a motion mechanism model of the device body being entirely unfolded using dotted lines and displays a motion mechanism model of the device body being folded to some angle using solid lines. In the drawing, A represents distance between an axis center of the pin and the first swing arm, S represents distance between the axis center of the pin and the second swing arm, α represents an included angle between the second swing arm and the horizontal plane (shaft cover bottom surface), β represents an included angle between the first swing arm and the horizontal plane, D represents a projection length of the distance between the first axis and the second axis on the horizontal plane, L1 represents the first swing arm, and γ represents an included angle between the second swing arm and A, where according to the structure provided by embodiments of this application, A is always perpendicular to L1, and A and S are fixed values.

The following can be learned from the sketch a of FIG. 11 based on a geometrical relationship:

$$y = \alpha - \beta + 90° = \delta + 90°$$

It can be learned that δ takes a maximum value when γ takes a maximum value. Therefore, the maximum value of δ can be determined so long as the maximum value of γ during rotation of the first swing arm and the second swing arm is determined. From the sketched motion mechanism shown by the sketch diagram a of FIG. 11, inference can be made that, during rotation of the device body from being entirely unfolded to being entirely folded, the included angle δ exhibits a trend of increasing first and then decreasing. When a projection of a connection line D between the first axis and the second axis on a distance connection line A between the axis center of the pin and the first swing arm takes a maximum value, the included angle γ reaches its maximum value, and accordingly the included angle δ also reaches its maximum value. At this point, the connection line A is parallel to the connection line D. Sketch b of FIG. 11 displays a motion mechanism model of the first swing arm and the second swing arm when δ and γ take their maximum values. From the sketch b of FIG. 11, it can be learned, based on a geometrical relationship, that the maximum value $\gamma_{max}$ of γ is:

$$\gamma_{max} = \sin^{-1}\left(\frac{D-A}{S}\right) + 90° = \delta_{max} + 90°$$

Therefore, the maximum value $\delta_{max}$ of the included angle δ is:

$$\delta_{mx} = \sin^{-1}\left(\frac{D-A}{S}\right)$$

Therefore, so long as the included angle δ' between the lower edge and the upper edge of the boss is greater than or equal to $\delta_{max}$, it can be guaranteed that the inner ring of the annular groove does not collide with the outer edge of the boss.

It can be learned from the foregoing technical solutions that, in the foldable electronic device according to the embodiments of this application, fitting between the annular groove and the boss increases the sectional area of the joint between the first swing arm and the second swing arm so as to reduce the shear stress experienced by the pin, avoiding fracture of the pin under an undesirably large shear stress, thereby making the device body of the electronic device have more reliable damping when folded or unfolded.

It is easy to understand that, based on several embodiments provided in this application, a person skilled in the art may combine, split, or recombine the embodiments of this application to obtain other embodiments, and no such embodiments exceed the protection scope of this application.

The objectives, technical solutions, and beneficial effects of this application have been further described in detail above using specific implementations. It should be understood that the above described are merely specific implementations of this application, which are not intended to limit the protection scope of this application. Any modifications, equivalent replacements, and improvements made based on the technical solutions of this application shall fall within the protection scope of this application.

What is claimed is:

1. An electronic device, comprising:
a shaft cover:
a device body:
a first swing arm connecting the shaft cover and the device body, wherein the first swing arm is configured to be rotatable around a first axis that is inside the shaft cover, so that the device body is folded or unfolded around the first axis;

a second swing arm distributed in parallel to the first swing arm in a direction of the first axis and coupled to a damping component that is inside the shaft cover; and a pin connecting the first swing arm and the second swing arm at an end close to the device body, so that the second swing arm follows the first swing arm to rotate around a second axis that is inside the shaft cover when the first swing arm rotates, and the second swing arm transmits a damping force produced by the damping component to the first swing arm through the pin, wherein the first axis is parallel to the second axis;

wherein:

the first swing arm further comprises an annular groove protruding toward the second swing arm;

the second swing arm further comprises a boss protruding toward the first swing arm, wherein the boss is embedded into the annular groove in an axial direction of the pin, so that the boss and the annular groove bear part of the damping force when the second swing arm follows the first swing arm to rot;

the first swing arm is provided with a first connection lug at an end that is away from the shaft cover, and the second swing arm is provided with a second connection lug at an end that is away from the shaft cover, wherein the first connection lug is distributed in parallel to the second connection lug in the direction of the first axis;

the first connection lug is provided with a slide groove, wherein the slide groove runs through the first connection lug in the direction of the first axis;

the second connection lug is provided with a pin hole, wherein the pin hole runs through the second connection lug in the direction of the first axis, and the pin hole is located in a projection of the slide groove in the direction of the first axis; and the pin passes through the slide groove and the pin hole, so that the first swing arm and the second swing arm form a pin-shaft connection.

2. The electronic device according to claim 1, wherein:

the first connection lug comprises a first end surface facing the second connection lug, wherein the annular groove is arranged on the first end surface, and the slide groove is located in a region enclosed by an inner ring of the annular groove;

the second connection lug comprises a second end surface facing the first connection lug, wherein the boss is arranged on the second end surface, and the pin hole is located in a region enclosed by an edge of the boss; and the annular groove overlaps with the boss in thickness in the axial direction of the pin.

3. The electronic device according to claim 1, wherein a gap between the slide groove and the pin is smaller than a gap between the inner ring of the annular groove and the boss.

4. The electronic device according to claim 3, wherein the pin is configured to deform when transmitting a damping force, so as to reduce the gap between the inner ring of the annular groove and the boss; and wherein, when the damping force transmitted by the pin is greater than a threshold, the pin deforms to make the inner ring of the annular groove contact the boss, so that the boss and the annular groove bear part of the damping force transmitted by the pin.

5. The electronic device according to claim 1, wherein the slide groove is a rectangular groove, wherein a long side of the slide groove is parallel to the first swing arm, so that the pin also follows the first swing arm to slide in a direction of the long side of the slide groove when the first swing arm rotates and the first axis and the second axis are not coaxial.

6. The electronic device according to claim 5, wherein the boss comprises an upper edge facing the second swing arm and a lower edge facing away from the second swing arm, wherein the upper edge is parallel to the second swing arm, and the lower edge has an included angle with the upper edge, so that distance between the lower edge and the upper edge is reduced gradually in a direction approaching the shaft cover; and wherein the included angle between the lower edge of the boss and the upper edge of the boss is greater than or equal to a target angle, wherein the target angle is a maximum value of an included angle between the first swing arm and the second swing arm when the second swing arm follows the first swing arm to rotate.

7. The electronic device according to claim 5, wherein a length of the boss in a direction parallel to the second swing arm is greater than a length of the boss in a direction perpendicular to the second swing arm.

8. The electronic device according to claim 5, wherein, in a direction parallel to the second swing arm, a distance between the pin hole and an edge of the boss facing the shaft cover is greater than a distance between the pin hole and an edge of the boss facing away from the shaft cover.

9. The electronic device according to claim 5, wherein, in a direction parallel to the first swing arm, a distance between the slide groove and a short side of the first connection lug facing the shaft cover is greater than a distance between the slide groove and a short side of the first connection lug facing away from the shaft cover.

10. The electronic device according to claim 5, wherein the first connection lug is a rectangular connection lug, wherein a long side of the first connection lug is parallel to the first swing arm, and wherein a short side of the first connection lug is perpendicular to the first swing arm.

11. The electronic device according to claim 10, wherein, in a direction parallel to the first swing arm, the distance between the slide groove and a short side of the first connection lug facing the shaft cover is greater than the distance between the slide groove and a short side of the first connection lug facing away from the shaft cover.

12. The electronic device according to claim 5, wherein:

the pin comprises a pin head and a pin rod, wherein a diameter of the pin head is greater than a diameter of the pin rod;

the pin head is located at an end of the first connection lug facing away from the second connection lug and is in position interference with the first connection lug in a direction of an axis of the pin; and the pin rod has one end connected to the pin head and the other end extending through the slide groove and the pin hole to the outside of the second connection lug, wherein a cylindrical surface of the pin rod outside the second connection lug is provided with a clamp slot, wherein a clamp spring is arranged inside the clamp slot, and the clamp spring forms position interference with the second connection lug in the direction of the axis of the pin.

13. The electronic device according to claim 1, wherein the device body comprises a middle frame, wherein the first swing arm is connected to the middle frame.

14. The electronic device according to claim 2, wherein the slide groove is a rectangular groove, wherein a long side of the slide groove is parallel to the first swing arm, so that the pin also follows the first swing arm to slide in a direction of the long side of the slide groove when the first swing arm rotates and the first axis and the second axis are not coaxial.

15. The electronic device according to claim 3, wherein the slide groove is a rectangular groove, wherein a long side of the slide groove is parallel to the first swing arm, so that the pin also follows the first swing arm to slide in a direction of the long side of the slide groove when the first swing arm rotates and the first axis and the second axis are not coaxial.

16. The electronic device according to claim 4, wherein the slide groove is a rectangular groove, wherein a long side of the slide groove is parallel to the first swing arm, so that the pin also follows the first swing arm to slide in a direction of the long side of the slide groove when the first swing arm rotates and the first axis and the second axis are not coaxial.

17. The electronic device according to claim 6, wherein, in a direction parallel to the second swing arm, a distance between the pin hole and an edge of the boss facing the shaft cover is greater than a distance between the pin hole and an edge of the boss facing away from the shaft cover.

18. The electronic device according to claim 7, wherein, in a direction parallel to the second swing arm, a distance between the pin hole and an edge of the boss facing the shaft cover is greater than a distance between the pin hole and an edge of the boss facing away from the shaft cover.

19. The electronic device according to claim 6, wherein, in a direction parallel to the first swing arm, a distance between the slide groove and a short side of the first connection lug facing the shaft cover is greater than a distance between the slide groove and a short side of the first connection lug facing away from the shaft cover.

\* \* \* \* \*